Patented Feb. 24, 1931

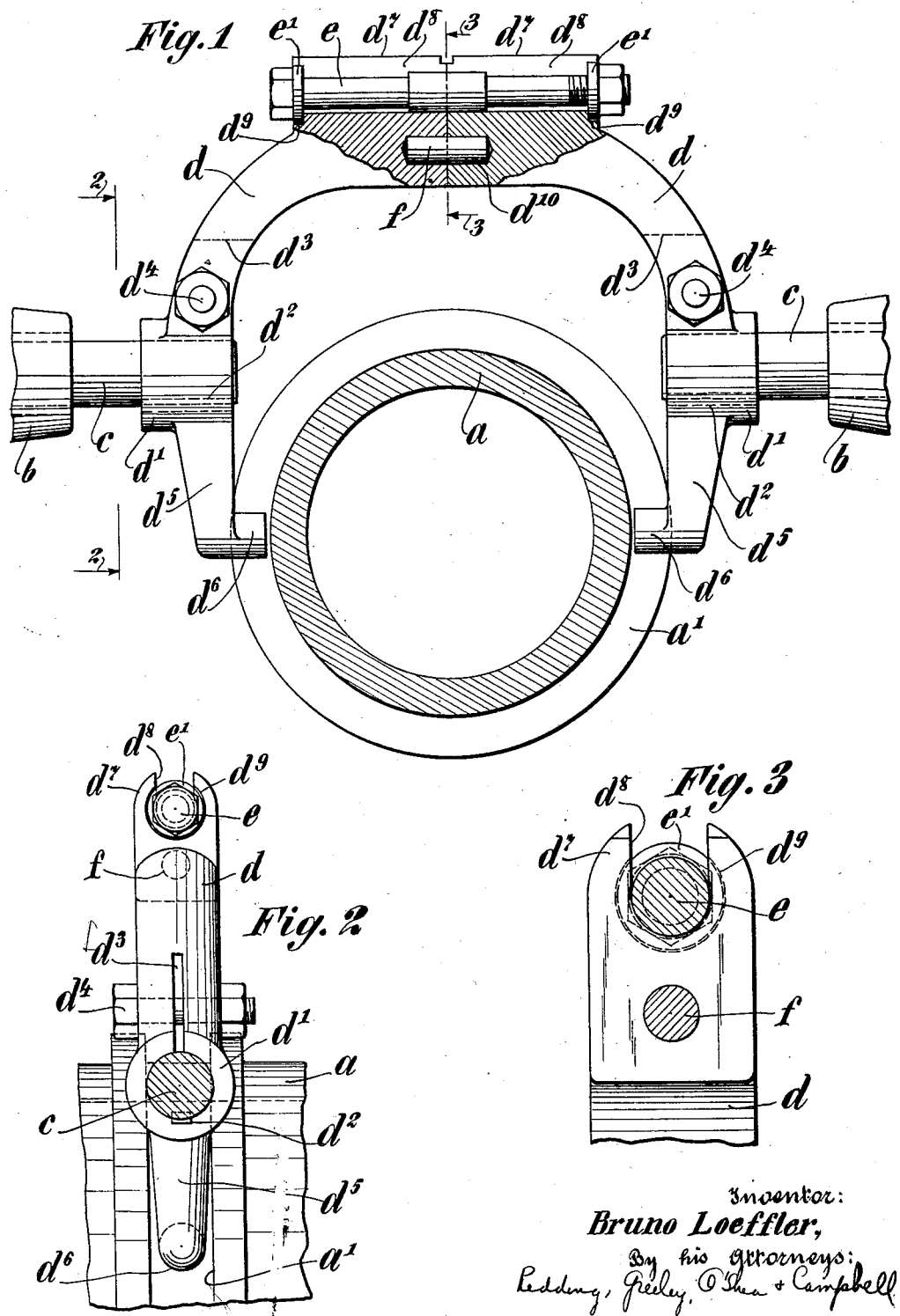

1,793,500

UNITED STATES PATENT OFFICE

BRUNO LOEFFLER, OF PLAINFIELD, NEW JERSEY, ASSIGNOR TO INTERNATIONAL MOTOR COMPANY, OF NEW YORK, N. Y., A CORPORATION OF DELAWARE

CLUTCH-YOKE CONSTRUCTION

Application filed September 12, 1929. Serial No. 392,082.

The present invention relates to clutch constructions and embodies, more specifically, an improved clutch yoke construction which facilitates the assembly and dismounting of the clutch, at the same time affording a rigid unitary member formed of assembled elements to replace the solid units which have been used heretofore.

The great difficulty in assembling the clutch elements, particularly the clutch yoke for operating the throw out mechanism, has long been known. Heretofore the yoke has been formed of a single piece and has therefore been very difficult to assemble in the clutch structure. The present invention seeks to provide an improved yoke construction whereby it may be assembled with comparative ease, the strength thereof being preserved in order that the operation of the clutch may not be impaired.

An object of the invention, accordingly, is to provide an improved clutch yoke construction which simplifies the assembly of the clutch elements and accordingly facilitates inspection thereof, as well as replacement.

A further object of the invention is to provide a clutch yoke which may be applied after the cooperating clutch elements have been assembled.

A further object of the invention is to provide an assembled clutch yoke which is simple in construction and easy to manufacture, at the same time greatly facilitating the mounting thereof within the clutch, as well as affording a construction of adequate strength.

Further objects, not specifically enumerated above, will be apparent as the invention is described in greater detail in connection with the accompanying drawings, wherein:

Figure 1 is a view in elevation, taken through the groove of a clutch throw out bearing and showing a clutch yoke constructed in accordance with the present invention, portions thereof being broken away and in section to illustrate the details more effectively.

Figure 2 is a view in section, taken on line 2—2 of Figure 1, and looking in the direction of the arrows.

Figure 3 is a view in section, taken on line 3—3 of Figure 1, and looking in the direction of the arrows.

Referring to the above drawings, $a$ designates a sleeve carrying a throw out bearing and formed with a circumferential yoke engaging groove $a'$. Bearings $b$ formed on the stationary portion of the clutch carry shafts $c$, one of which may be an operating shaft actuated by the clutch pedal. A clutch yoke is shown mounted upon these shafts and comprises similar yoke portions $d$ formed with enlarged portions $d'$ for receiving the end of shafts $c$. Keys $d^2$ are provided in order that the yoke portions may be rigidly secured to the shaft sections. To facilitate mounting, the yoke portions are slotted at $d^3$ and transverse bolts $d^4$ extend therethrough in order that the shaft sections $c$ may be tightly secured within the enlarged portions $d'$ after the elements have been properly assembled. Extensions $d^5$ are formed on the yoke portions and carry fingers $d^6$ which engage in the groove $a'$. The yoke portions thus move the sleeve $a$ axially in a well known manner.

Bosses $d^7$ are formed on the adjacent portions of the yoke sections $d$ and are grooved at $d^8$ to receive a bolt $e$. On the outer faces of the bosses $d^7$, recessed portions $d^9$ are formed in which the bolt head and nut lie in order that the bolt will not be lost from the connection should it accidentally become loosened.

The bolt $e$ may be assembled with washers $e'$ which lie within the recesses $d^9$, as described above, and a pin $f$ is received within suitable recesses $d^{10}$ in the yoke sections to afford a more rigid assembled unit.

It will be seen from the foregoing description that the clutch yoke may be assembled in the structure after the remaining clutch elements have been assembled by means of the sectionalized construction described above. After the elements have been assembled, they are secured effectively in position in an obvious manner, and while the invention has been described with specific reference to the construction shown in the accompanying drawings, it is not to be limited, save as defined in the appended claims.

What I claim is:

1. A clutch construction comprising stationary journal bearings, a yoke operated sleeve, shaft sections journaled in the bearings, yoke sections, means to secure the sections to the shafts removably, opposed bosses formed on the sections, means on the sections engaging the sleeve, aligned grooves in the bosses, recesses in the bosses at the ends of the grooves, recesses in the adjacent faces of the bosses, a pin engaging the recesses, and a bolt in the grooves to secure the sections together, the bolt head and nut lying in the recesses to prevent displacement of the bolt from the grooves when the bolt is loosened.

2. A clutch construction comprising stationary journal bearings, a yoke operated sleeve, shaft sections journaled in the bearings, yoke sections, means to secure the sections to the shafts removably, opposed bosses formed on the sections, means on the sections engaging the sleeve, aligned grooves in the bosses, recesses in the bosses at the ends of the grooves, and a bolt in the grooves to secure the sections together, the bolt head and nut lying in the recesses to prevent displacement of the bolt from the grooves when the bolt is loosened.

3. A clutch construction comprising stationary journal bearings, a yoke operated sleeve, shaft sections journaled in the bearings, yoke sections, means to secure the sections to the shafts removably, opposed bosses formed on the sections, means on the sections engaging the sleeve, aligned grooves in the bosses, and a bolt in the grooves to secure the sections together.

4. A clutch construction comprising stationary journal bearings, a yoke operated sleeve, shaft sections journaled in the bearings, yoke sections, means to secure the sections to the shafts removably, opposed bosses formed on the sections, means on the sections engaging the sleeve, and means to secure the bosses together.

This specification signed this 6th day of Sept., A. D. 1929.

BRUNO LOEFFLER.